United States Patent [19]

Manly, Jr.

[11] 3,872,235
[45] Mar. 18, 1975

[54] INFLATABLE HOUSING FOR AN ELECTRICITY CONSUMING DEVICE
[75] Inventor: Frank W. Manly, Jr., Dalton, Ga.
[73] Assignee: Lawrence Peska Associates, Inc., New York, N.Y.; a part interest
[22] Filed: Feb. 4, 1974
[21] Appl. No.: 439,301

[52] U.S. Cl............... 174/52 R, D42/7 R, D56/4 B, 40/152.2, 58/56, 240/10 C, 248/1, 248/116, 248/350, 248/442, 312/7 R, 325/352
[51] Int. Cl. ............................................. H05k 5/00
[58] Field of Search............ 174/17 R, 50, 52 R, 54; 240/10 C, 52 R; 317/99, 101 R, 120; 338/147 R, 147 C; 9/8.3 E; 40/132 A, 152.2; 52/2; 58/53, 55, 56; 248/1, 114, 115, 116, 346, 350, 442, 450; D42/7 R; D56/4 B

[56] References Cited
UNITED STATES PATENTS
2,078,707  4/1937  Braunschweig................... 240/10 C
2,222,246  11/1940  Tober................................... 9/3.8 E FOREIGN PATENTS OR APPLICATIONS
581,741  10/1924  France..................................... 58/56
10,608  11/1898  Great Britain ...................... 9/3.8 E Primary Examiner—Laramie E. Askin
Attorney, Agent, or Firm—Carl P. Steinhauser

[57] ABSTRACT

An inflatable housing for an electricity consuming device such as a clock, radio, or similar device.

8 Claims, 5 Drawing Figures

PATENTED MAR 18 1975  3,872,235

INFLATABLE HOUSING FOR AN ELECTRICITY CONSUMING DEVICE

BACKGROUND OF THE INVENTION

The invention relates to an inflatable housing for an electricity consuming device, i.e. a clock, a radio, a lamp and the like.

In view of the current trend toward inflatable furnishings such as chairs, sofas, and even beds, it is desirable to provide inflatable housings for electricity consuming type appliances because when not in use, or to facilitate repair, the housing can be deflated and thus occupies little space; while when in use, the housing creates the impression of opulence.

DESCRIPTION OF THE INVENTION

The invention provides an inflatable housing, usually of plastic in keeping with the current trend in furniture, having an opening into which the face of the electrical appliance or electricity consuming device hermetically fits. The housing and electrical appliance or electricity consuming device are provided with mating plugs so that the electricity consuming device can be connected to a power source. Usually, though not necessarily, the housing is provided with a female receptacle while the electricity consuming device has a male mating plug.

While the housing may have any desired shape, form, or size, it is preferably wedge-shaped and has an opening on its inclined surface, which is the hypotenuse of a right triangle formed by a base and an upright side, to receive a face or control panel of an electricity consuming device. The housing is provided with a conventional plug-type valve to facilitate inflation and deflation thereof.

The invention will be described with reference to the accompanying drawing in which.

Figure 1:
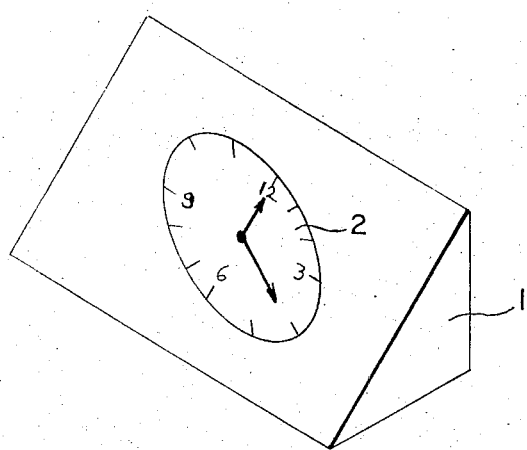
FIG. 1 shows an inflated wedge-shaped housing for an electricity consuming device, in this case a clock.

As shown in FIG. 1, a simple electric clock is supported within a wedge-shaped inflatable housing 1 with its face 2 hermetically sealed in an opening in the inclined surface of the housing of plastic material.

Figure 2:
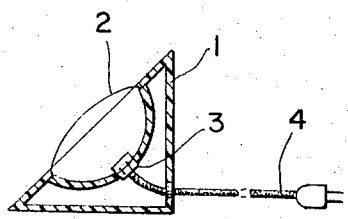
FIG. 2 shows a side sectional view of the inflated wedge-shaped housing for the electricity consuming device with the power cord.

The housing 1 is a one-piece plastic sheet as shown in FIG. 2 within which is provided a connector plug 3 attached to a power cord 4. A mating plug on the clock fits together with the plug in the housing to power the clock.

Figure 3:
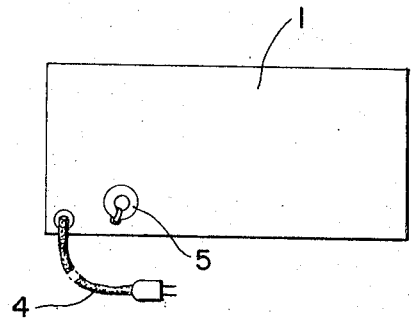
FIG. 3 shows a rear view of the inflated housing.

On the rear side of the wedge-shaped inflatable housing is provided conventional plug type valve 5 which can be opened either to release air and deflate the housing, or to inflate the housing (FIG. 3).

Figure 4:
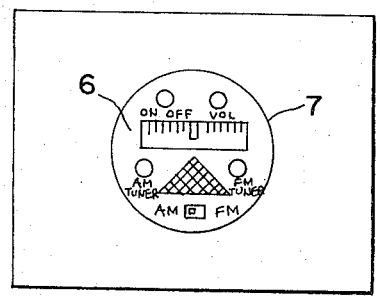
FIGS. 4 and 5 show other electricity consuming devices in an inflatable housing according to the invention.

FIG. 4 simply shows that the housing may be used to support a radio or other entertainment device. In this case the radio is a conventional transistor type radio, the front face 6 of which with the controls are inserted in the aperture 7.

Figure 5:
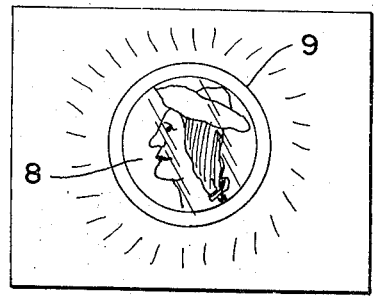

FIG. 5 simply shows that a mirror 8, or a picture transparency, can be mounted in the aperture with a source of illumination 9 mounted behind the mirror or picture.

It is apparent that neither the particular shape of the housing, nor the type of electricity consuming device is of the highest importance, but simply the use of an inflatable housing with an aperture into which one face of the electricity consuming device is hermetically sealed.

Having herein described the invention, what is claimed as new is:

1. In combination, an electricity consuming device and an inflatable housing for said electricity consuming device comprising a sheet of material forming an inflatable triangular enclosure, said sheet having an opening in one face thereof for exposing said electricity consumer device, means within said housing to an electrical energy source, and means integral with said sheet of material to inflate said sheet and form said enclosure.

2. The combination as claimed in claim 1 in which said housing consists of material which is plastic.

3. The combination as claimed in claim 1 in which said connecting means is a mating plug for connecting said electricity consuming device to said electrical energy source.

4. The combination as claimed in claim 1 in which said housing when inflated is a right triangle.

5. The combination as claimed in claim 4 in which said opening is in the side of said housing which is the hypotenuse of the right triangle.

6. The combination as claimed in claim 5 in which said electricity consuming device is a clock.

7. The combination as claimed in claim 5 in which said electricity consuming device is a radio.

8. The combination as claimed in claim 5 in which said electricity consuming device is a source of illumination.

* * * * *

PO-1050
(5/69)

UNITED STATES PATENT OFFICE
CERTIFICATE OF CORRECTION

Patent No. 3,872,235            Dated March 18, 1975

Inventor(s)     FRANK W. MANLY, JR.

It is certified that error appears in the above-identified patent and that said Letters Patent are hereby corrected as shown below:

Column 2, in the claims, line 30 after "sumer device" insert -- for connecting said electricity consuming device --.

Signed and sealed this 24th day of June 1975.

(SEAL)
Attest:

RUTH C. MASON
Attesting Officer

C. MARSHALL DANN
Commissioner of Patents
and Trademarks